Figure 1:
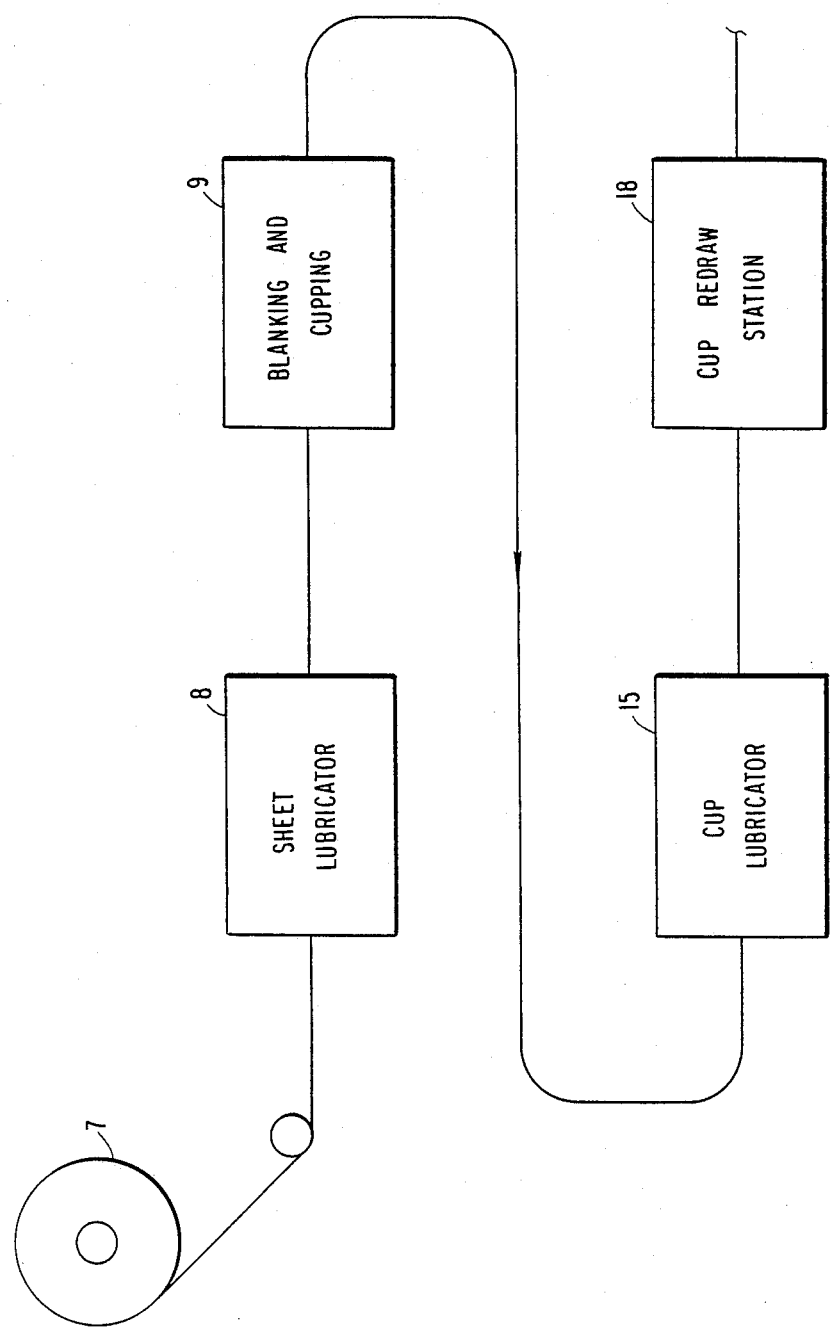

United States Patent [19]

Bray et al.

[11] Patent Number: 4,823,732
[45] Date of Patent: Apr. 25, 1989

[54] ATOMIZED PARTICLE LUBRICATION OF CUP-SHAPED CAN BODIES

[75] Inventors: James A. Bray, Salineville; Robert L. Applegate, New Cumberland, both of W. Va.

[73] Assignee: Weirton Steel Corporation, Weirton, W. Va.

[21] Appl. No.: 236,235

[22] Filed: Aug. 25, 1988

Related U.S. Application Data

[60] Division of Ser. No. 68,065, Jun. 30, 1987, which is a continuation-in-part of Ser. No. 11,112, Feb. 5, 1987, Pat. No. 4,724,155, which is a continuation-in-part of Ser. No. 681,630, Dec. 14, 1984, abandoned.

[51] Int. Cl.⁴ .............................................. B05D 1/04
[52] U.S. Cl. ..................................... 118/622; 118/629; 118/633; 118/634; 118/317; 118/324
[58] Field of Search ............... 118/622, 629, 633, 634, 118/317, 324

[56] References Cited

U.S. PATENT DOCUMENTS

| | | | |
|---|---|---|---|
| 2,888,362 | 5/1959 | Starkey | 118/630 |
| 3,645,778 | 2/1972 | Nesteruk | 427/33 |
| 4,170,193 | 10/1979 | Scholes | 118/634 |

Primary Examiner—Richard Bueker
Attorney, Agent, or Firm—Raymond N. Baker

[57] ABSTRACT

Cup lubricating process and apparatus in which cup-shaped can bodies are controllably conveyed in spaced relationship to each other through a lubrication application chamber. Lubricant is atomized to particle sizes permitting them to be gas borne and introduced into such chamber from a plurality of locations about the travel path for can bodies. Apertures in the bottom wall of such chamber direct lubricant particles directly into the open ends of such can bodies for flow impingement deposition on internal surfaces thereof. Provision is made for augmenting surface deposition by electrically charging at least a portion of the gas-borne lubricant particles in such chamber and electrically grounding can bodies individually during passage through such chamber. Endless loop conveyor means are provided with adjustable features enabling a travel path to be adapted to differing dimension can bodies.

8 Claims, 5 Drawing Sheets

ATOMIZED PARTICLE LUBRICATION OF CUP-SHAPED CAN BODIES

This is a division of application Ser. No. 068,065 filed June 30, 1987, which was a continuation-in-part of application Ser. No. 011,112 filed Feb. 5, 1987 (now U.S. Pat. No. 4,724,155 dated Feb. 9, 1988), which was a continuation-in-part of application Ser. No. 681,630 filed Dec. 14, 1984 (now abandoned), the entire disclosures of which are incorporated herein by reference.

The present invention is concerned with controlling continuous in-line movement and atomized particle lubrication of cup-shaped sheet metal can bodies during transfer between work stations in a can body fabricating line.

An important contribution of the invention enables such lubrication to be carried out in-line without substantial interruption of sequential can body fabricating steps. A can body travel path is established through a lubricant application chamber providing controlled passage of can bodies in spaced relationship to each other while minimizing contact of conveyance means with the can bodies in order to minimize blocking lubricant particle deposition. A desired lubricant coating, e.g. of the type which eliminates the need for washing of the can bodies subsequent to fabrication, and before use, is obtained.

Figure 2:
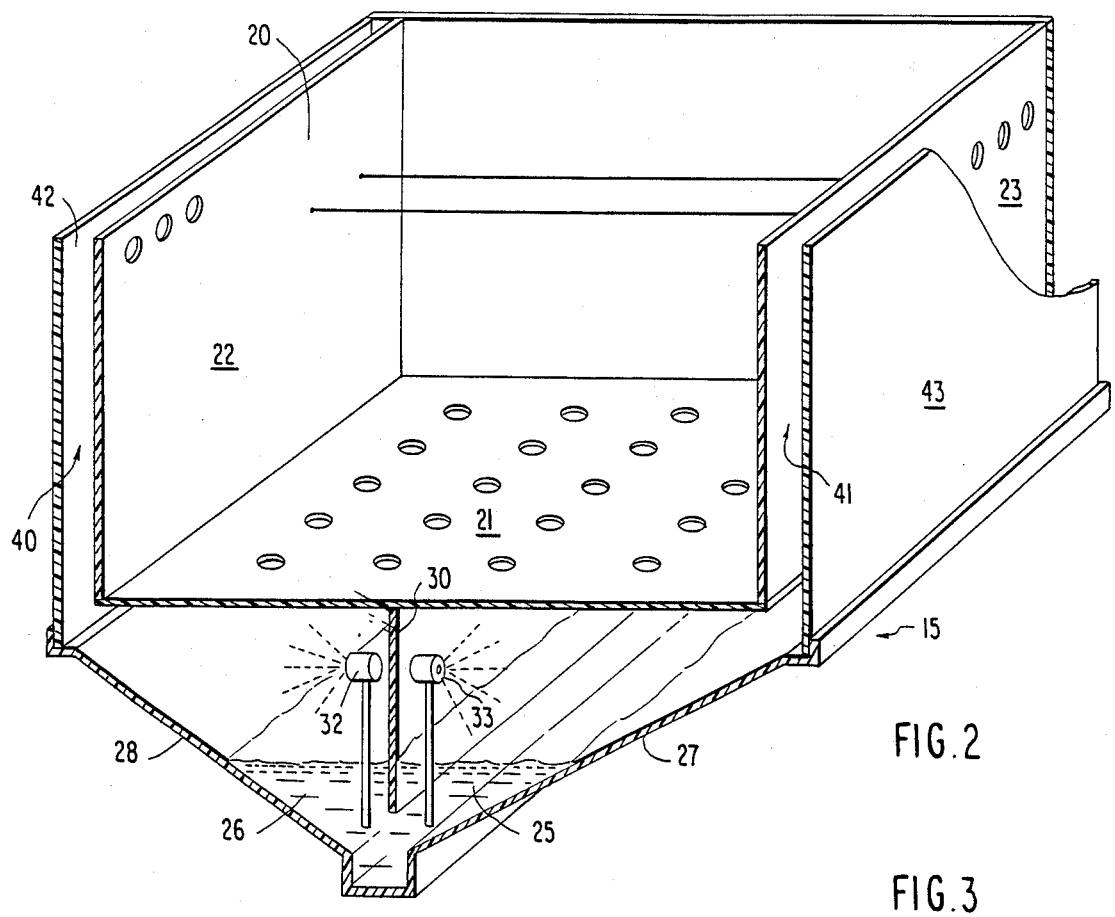
Figure 3:
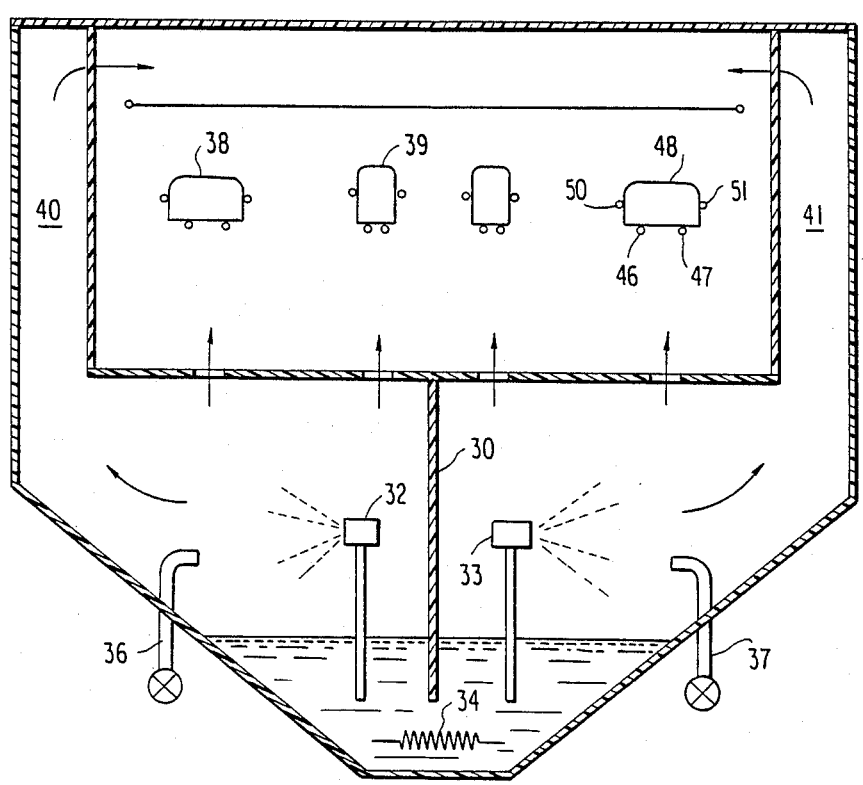
Figure 4:
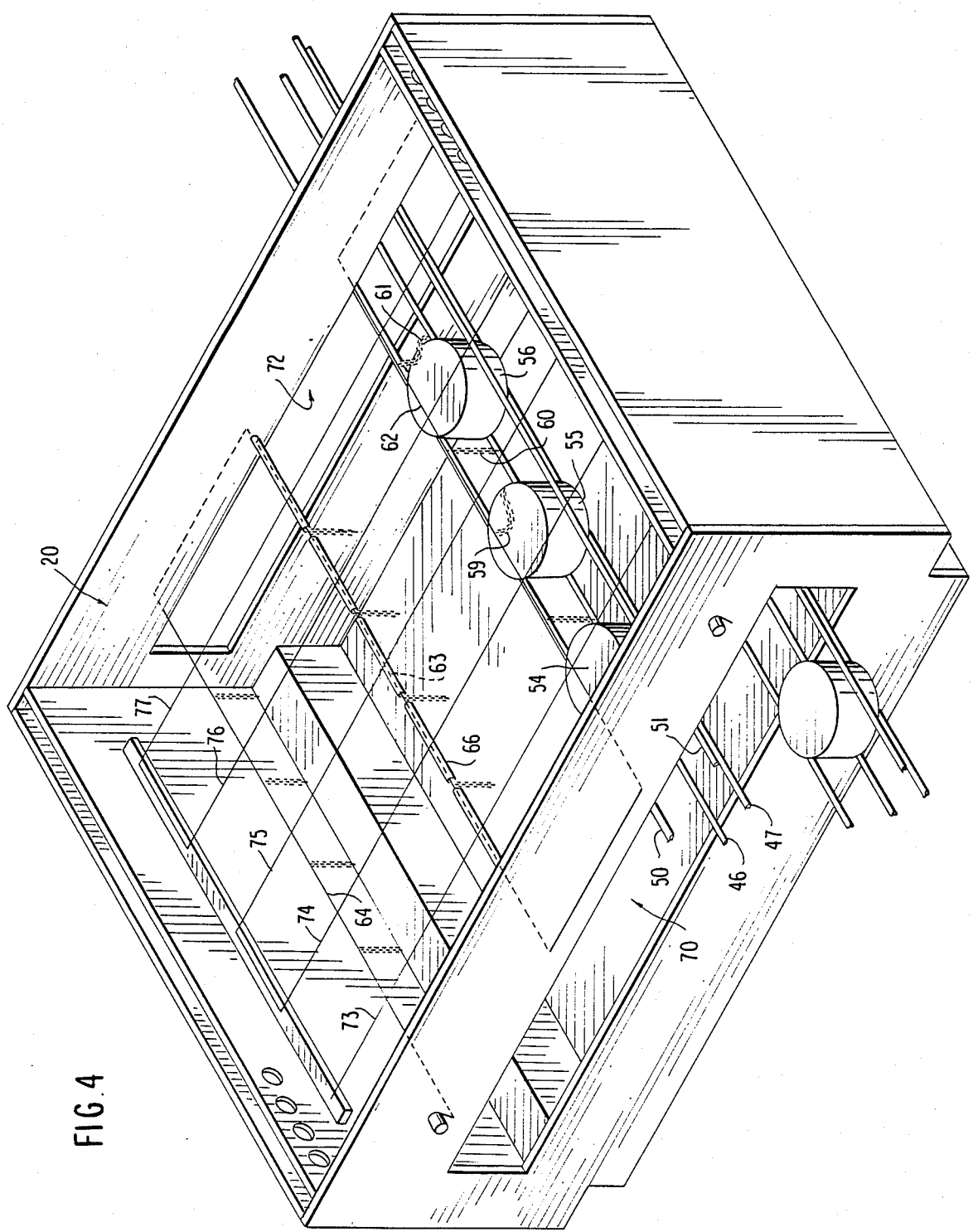
Figure 5:
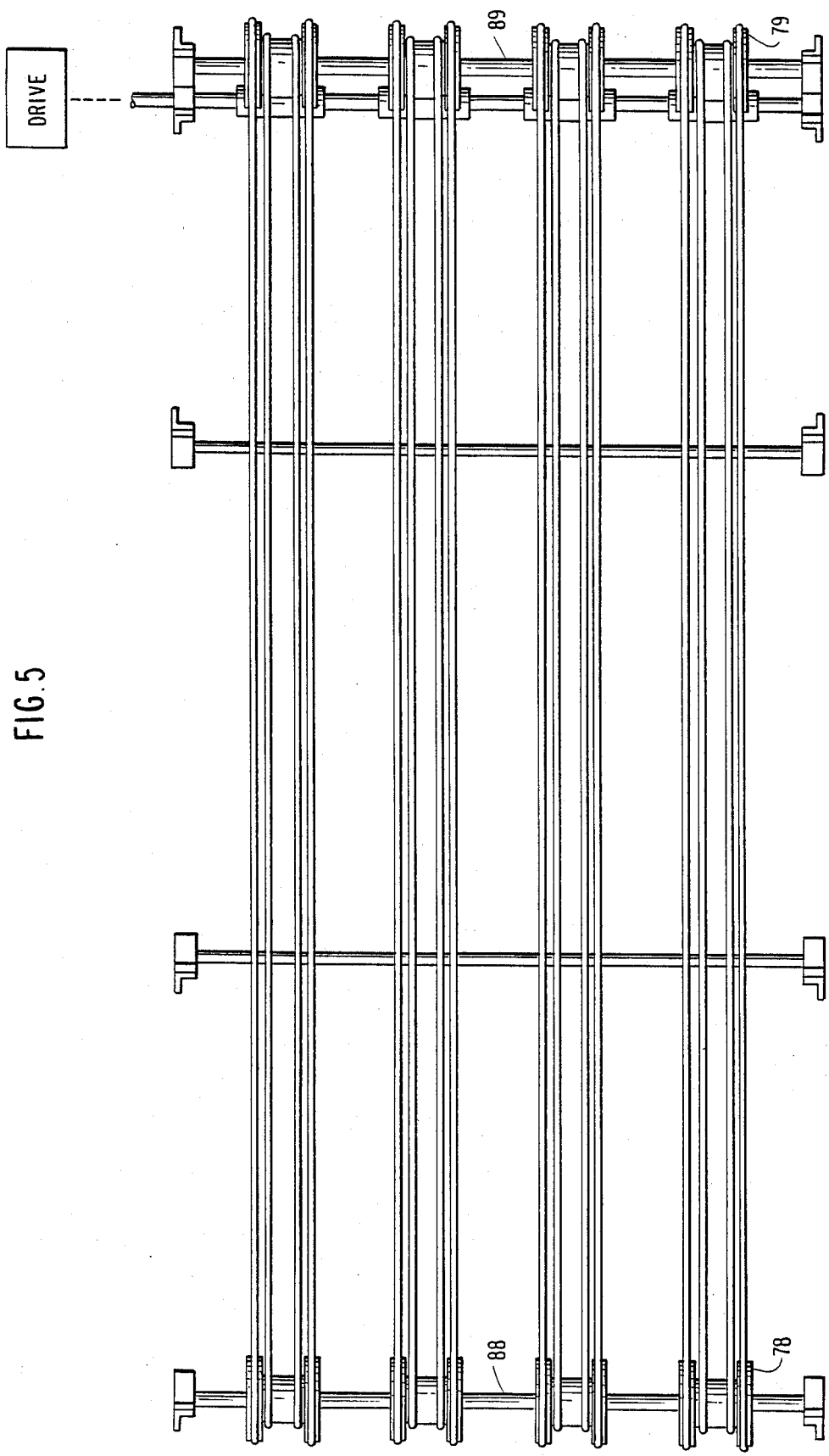
Figure 6:
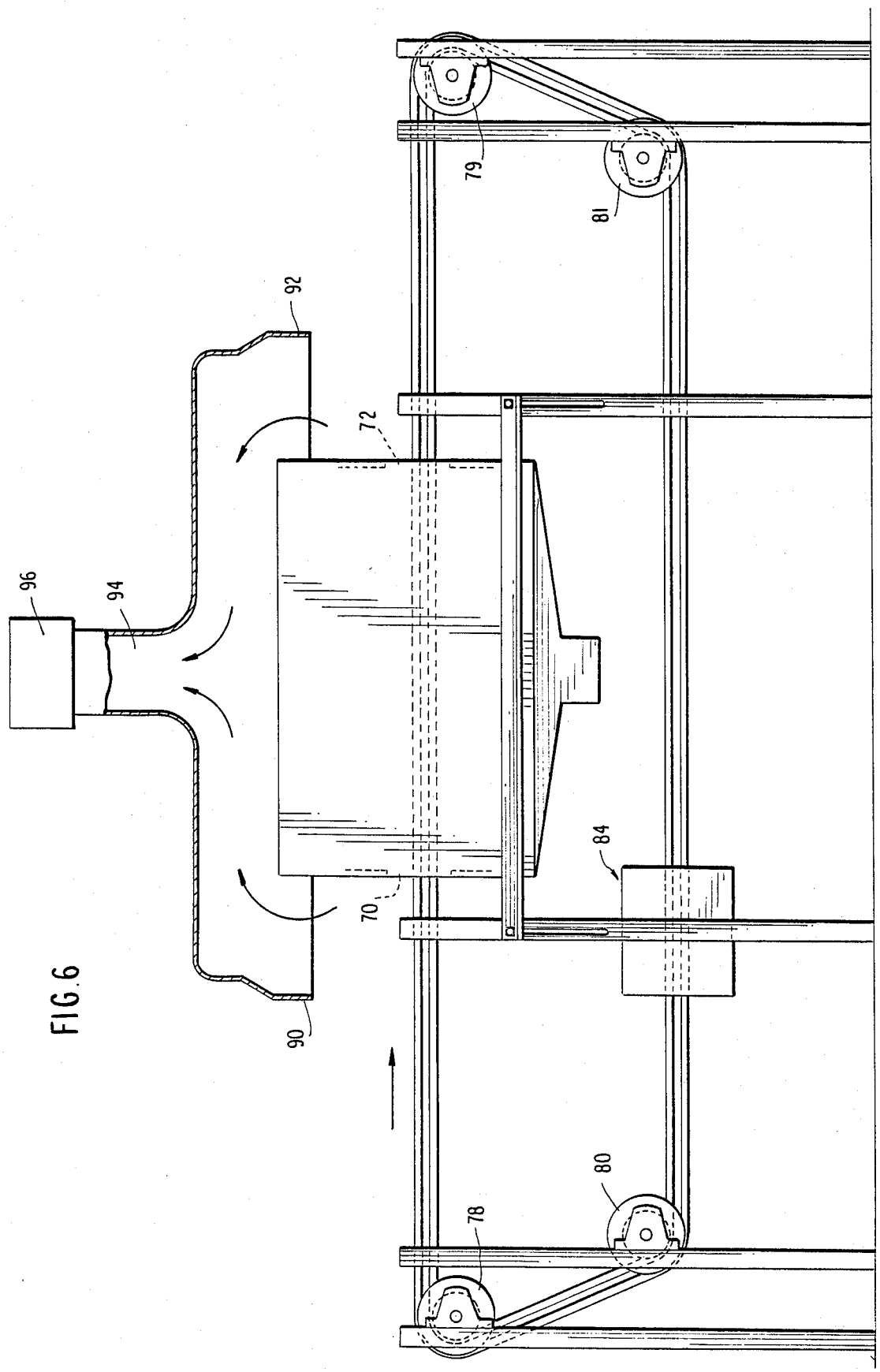

Other advantages and contributions of the invention are set forth in more detail in describing apparatus as shown in the accompanying drawings, in which:

FIG. 1 is a schematic diagram of portions of a can body fabricating line including in-line lubricating apparatus in accordance with the invention, FIG. 2 is a schematic perspective view, with portions cut away and omitted for clarity, of a portion of the cup lubricant deposition apparatus of the invention, FIG. 3 is a schematic cross-sectional view, along a plane which is perpendicularly transverse to the direction of movement of can bodies, of lubricating apparatus in accordance with the invention, FIG. 4 is a perspective view, with portions cut away and omitted for clarity, of lubrication apparatus in accordance with the invention, FIG. 5 is a plan view showing adjustable means for supporting and stabilizing means during passage through lubricant deposition chamber in accordance with the invention, and FIG. 6 is a side elevational view of cup lubricating apparatus in accordance with the invention.

During can-making operations, continuous-strip flat rolled sheet metal, such as flat rolled steel having a protective "organic coating" (the organic polymer coatings used in the canning industry) is lubricated on both its planar surfaces before being cut into blanks. Shallow cups are formed initially from blanks; usually at the blanking station. Subsequent forming operations, e.g. redrawing at other stations, are required to produce the extended side wall heights used in the manufacture of two-piece cans for soups and vegetables. Additional lubrication of the work product can be helpful in such subsequent forming operations where insufficient lubrication remains from the flat metal lubrication stage due, e.g., to delays occurring before or between the subsequent forming operations.

Liquid "wash" or dipping was previously available for lubricating cups but no successful method or means for atomized particle lubrication of cup-shaped can bodies was known or commercially available. It was not recognized that the electrostatic atomized lubricant particle deposition methods relied on for lubrication of sheet metal in flat form could not be readily or satisfactorily transferred to can body lubrication because the cup shaped sheet metal shielded the interior thereof from electrostatic forces.

The present invention enables atomized particle lubrication of both internal and external surfaces of cup-shaped can bodies to be carried out, where and when needed for sequential forming operations, by methods and means for controllably directing particles into a chamber located above an atomizing chamber so as to achieve desired deposition on can bodies moving through such chamber.

In the schematic diagram of FIG. 1, sheet metal can stock having an organic polymeric coating on both its planar surfaces, is fed from coil 7 into sheet lubricator 8 in which both such surfaces are lubricated. Such lubricated can stock is fed directly into blanking and cupping apparatus 9. Individual shallow cups, from apparatus 9, are then directed along a travel path, which can include cup lubrication apparatus 15, and a subsequent forming operation at work station 18. For example, at work station 18 the can body is redrawn to a smaller diameter and increased side wall height.

When supplemental lubrication is required, the cup-shaped sheet metal can bodies are controllably conveyed, i.e. uniformly oriented in spaced relationship to each other, during passage through a cup lubrication apparatus 15 which is placed in an operating mode for such purpose.

Referring to FIG. 2, lubrication apparatus 15 includes a lubricant deposition chamber 20, through which horizontally-oriented travel path(s) for can bodies extend as indicated by FIGS. 3, 4 and 6.

The lubricant deposition chamber 20 is defined by enclosure means providing a bottom wall 21, lateral side walls 22, 23, an exit wall 24, and entrance and top walls; an exit port for can bodies is provided through wall 24; the entrance and top walls are also omitted in the perspective view of FIG. 2. As taught herein, such chamber defining wall means are formed from rigid electrically non-conductive, plastic sheet stock, such as polypropylene, and do not require electrical grounding.

The desired lubricant is atomized to sizes permitting the lubricant particles to be borne and transported by a gaseous medium. In one embodiment, lubricant in liquid form, as supplied or established using heat, is provided in lubricant reservoirs 25, 26. This lubricant sump arrangement is established by sump walls such as walls 27, 28 and a central divider wall 30; such sump walls which define the reservoirs for lubricant can also be formed from plastic sheet stock. Individual atomizing means, such as 32, 33, are associated with each lubricant reservoir. Liquid lubricant is drawn from each reservoir and atomized utilizing suitable commercially available atomizing means. Suitable heating means for controlling the temperature of the lubricant, such as heating element 34, are provided to controllably establish and/or maintain desired lubricant temperature. Pressure in the atomizing sump is augmented and/or controlled to provide desired particle flow by auxiliary pneumatic supply means 36, 37 which are connected to means for automatically controlling pressure to selected levels.

Plural lubricant reservoirs, each with associated atomizing means and means for directing flow of gas-borne lubricant particles as in the illustrated embodiment, enable through teachings included herein atomized lubricant particle deposition on internal and external surfaces of cup-shaped work product without interrupting line movement of such work product.

Travel paths for can bodies, such as 38 and 39 of FIG. 3, are established in a unique manner which contributes significant advantages in supporting and stabilizing cups in desired orientation utilizing endless-belt loop means as shown and described in more detail in relation to FIGS. 3-6.

The movement of such cup-shaped work product and of gas-borne lubricant particles is controlled so as to direct such particles axially into open ends of such can bodies during passage along an established travel path. For example, gas-borne particles are directed through apertures as shown in bottom wall 21 (FIGS. 2,3); such apertures are vertically below each travel path for can bodies so as to direct lubricant particles into the open ends of such can bodies for flow impingement deposition on internal surfaces thereof. Such bottom wall introduction of particles into the deposition chamber can also provide at least a portion of the atomized lubricant particles for deposition on external surfaces through augmented lateral flow impingement and/or electrostatic forces, as taught herein.

Deposition on such external surfaces by flow impingement can be implemented by pneumatically introducing atomized particles through apertures selectively located on laterally opposite sides of the elongated, horizontal travel path(s) for the can bodies.

Electrical charging wires can be distributed along the direction of travel of can bodies throughout the lubricant deposition chamber 20 for electrostatic charging of atomized lubricant particles. Such wires extend across substantially the full lateral dimension of such chamber; and, can be selectively actuated preferably in at least the latter half of the travel path through the deposition chamber.

The location and the number of apertures to be used, as well as the location of electrostatic charging wires can be selected. Since a cup-shaped metal can body tends to shield its internal volume and surfaces from electrostatic forces, direct flow impingement of internal surfaces with atomized particles is preferably carried out initially after entry of a can body into the deposition chamber in an attempt to avoid interference with such internal surface deposition. Lateral side injection of atomized particles can be carried out independently or coordinated with electrostatic augmentation to the extent found useful to accomplish desired deposition as such can bodies move along such travel path(s).

In accordance with the invention, endless-belt, electrically-insulating loop means establish travel paths through the lubricant deposition chamber. They support and stabilize the sheet metal cups in spaced relationship, and oriented axially as desired for purposes described herein. As shown in FIG. 3, the endless-belt loops have a curvilinear exterior cross-sectional periphery which results in a tangential point contact with work product so as to minimize blockage of, or interference with, deposition of lubricant particles. The can bodies being fed to cup lubrication apparatus 15 are controllably conveyed in uniformly spaced relationship through chamber 20; such can bodies are also uniformly oriented; preferably with central axes substantially vertical as in the illustrated embodiment and with open ends directed downwardly.

Flexible, electrically non-conductive, plastic tubular material, such as polyurethane round belting, available from Eagle Belting Co., Des Plaines, Ill., is used for endless-belt loops. The endless belts stabilize and support cup-shaped work product during conveyance through chamber 20. For example, in FIG. 3, loops 46, 47 contact the open end portions of the downwardly-oriented can body 48 to support its weight; and endless loops 50, 51 contact the side wall of can body 48 at diametrically opposite sides to stabilize it in its upright position.

FIG. 4 depicts means for electrically grounding can bodies individually during passage in spaced relationship through lubricant application chamber 20 when electrostatic energy is to be used to augment flow-impingement particle deposition on the cup-shaped work product. Individual ground contact means are provided along at least a portion of the work product travel path for repetitious grounding of individual can bodies. Referring to the travel path defined by endless-belt loops 46, 47 and 50, 51 for can bodies 54, 55 and 56, the latter are shown in contact with flexible metallic conductors 59, 61 during a portion of the passage through chamber 20. Such flexible contact conductors are grounded through wire 62, which is grounded to the support frame, or otherwise; other ground wires shown are similarly grounded. Exterior surfaces of such elongated grounding wires are electrically insulated as they extend through the chamber 20 so as to avoid accumulation of lubricant particles and minimize current loss. For example, ground wire 63 is covered by electrical insulation 66 for such purposes. However, the work product contact conductors are exposed to facilitate electrical grounding of individual can bodies.

Flexible contacts are positioned so as to provide electrical contact with one or more external surfaces of a can body, such as its closed end as shown, or at its side wall or at its flange. The type of grounding conductor is selected and/or positioned to minimize accumulation of lubricant particles. With electrical grounding of can bodies, electrically-charged gas-borne lubricant particles have an opportunity, not otherwise available, to be attracted to uncoated surface portions of such can bodies.

The quantity of gas-borne particles introduced into chamber 20 is regulated by gas supplied to the lubricant sump atomizing chamber means. In a specific embodiment, gas flow from the atomizing chambers to the deposition chamber is selectively adjusted to coating weight desired and to the speed of the line. At line speeds above a selected median and when greater coating weight is desired, the gas flow is increased; at line speeds below a selected median and lower coating weight, the gas flow is decreased. The "flow rate" of lubricant particles into the application chamber can thus be regulated by regulating gas flow, e.g. air, supplied to the lubricant-atomizing sump(s). Such gas can be supplied as a part of pneumatic atomizing and/or supplied or augmented by regulating gas supplied separately to the sump(s) as shown in FIG. 3. Selection of the number and location of the apertures into the chamber is utilized, as described earlier, in achieving deposition on interior and exterior surfaces.

For grounding purposes, an insulated wire, which is grounded, is positioned along each work product travel path with non-insulated grounding contact means extending in the direction of work product. Flexible metallic conductors, exposed for electrical contact with the exterior of each can body, are electrically connected to the ground wires. A plurality of such flexible conductors are connected to each ground wire along each travel path so that plural periodic grounding of the exterior surface of each can body occurs during at least a portion of its controlled passage between entrance port 70 and exit port 72 of the lubricant deposition chamber 20; preferably in the latter half of that passage. Charging wires, such as 73, 74, 75, 76 and 77, are positioned to extend laterally of the chamber; preferably charging wires in the latter half of the passage, such as 75, 76, 77 are utilized when electrostatic augmentation is desired.

Referring to FIGS. 5 and 6, endless-belt loops for defining each travel path for continuous-line passage through deposition chamber means are shown in plan and lateral side elevational views, respectively, along with pulley support means; for example, pulley means 78, 79 in the plane of the travel paths and guide pulley means 80, 81 (FIG. 6) in the return paths. Belt cleaning means 84 are located in the return paths for wiping or otherwise removing accumulated lubricant and grit from the endless tubular belts before return to the can body travel paths.

Independent pulley wheels can be selected to establish dimensionally differing travel paths and/or the pulleys can be adjustably mounted along their respective support shafts 88, 89 (FIG. 5). The number of travel paths can be varied; also, the width between support loops and the height of and width between stabilizing loops can be selected.

The tubular belts are preferably of curvilinear cross-sectional configuration, e.g. circular, to minimize peripheral contact with can bodies being conveyed.

Use of pressurized flow and flow impingement forces for atomized lubricant particle deposition on surfaces of a cup-shaped work product results in continuous escape of particles from the deposition chamber 20. Such particles escape from the chamber at can body entry and exit ports 70, 72 (FIGS. 4,6). An important aspect of the invention is to efficiently and effectively gather such escaping flow-through lubricant particles so as to avoid ambient atmospheric contamination, but also to do so in a manner to avoid interference with flow paths of the particles within chamber 20. For such purposes, hoods 90, 92 (FIG. 6) are placed vertically above inlet and exit ports 70, 72, respectively. Also, these hoods are placed to extend across the full width of such ports; and, further are exhausted centrally, or at a plurality of spaced locations along the hood rather than being exhausted at one end of a hood. An exhaust conduit 94 is connected to a driven exhaust means indicated schematically at 96. Exhaust apparatus manufactured to meet such requirements is available commercially from Smog Eaters, Inc. of Gooding, Id.

Data for a specific embodiment for carrying out the invention are set forth below:

| | |
|---|---|
| Chamber 20 | |
| Longitudinal length (direction of can travel) | 37" |
| Lateral width (transverse to direction of movement of can bodies) | 44" |
| Height | 24" |
| Wall material (thickness) (commercial polypropylene sheet) | ½" |
| Lubricant | |
| Commercially available Petrolatum | |

-continued

| | |
|---|---|
| Heat to about 160 F. | |
| Atomizer | |
| Model #1/8-JJ-SS-J22D-SS | |
| Spraying System Inc. | |
| Wheaton, Ill. 60187 | |
| Endless-Belt Loops | ½" diameterpoly-urethane tubing |
| Charging wire, DC potential | about 15,000 to 32,000 volts (avoiding leakage of current, arcing or corono discharge) |
| Line Speed (adaptable to commercial can-making line practice) | |
| For Can sizes 211 × 400, 300 × 407 and 303 × 406 | typically 150 fpm |
| Lubricant Particle Size and Gas Pressure Transport | |
| Particle size - | |
| about 25 microns at 20 psi | |
| about 20 microns at 30 psi | |

Air pressure supplied to sumps—about 30 psia

Can sizes are expressed in diameter and height; the 211×400 (2-11/16" diameter, 4" height) is a typical soup can, 300×407 is a typical pet food can, and the 303×406 is typically used for fruits and vegetables.

While specific data, including materials, dimensions and configurations, have been set forth or shown for purposes of describing the invention, variations of those specifics would be available to those skilled in the art in the light of the present teachings. Therefore, reference to the appended claims is an added requirement for purposes of defining the scope of the patentable subject matter.

I claim:

1. Apparatus for providing atomized liquid lubrication of interior and exterior surfaces of cup-shaped sheet metal can bodies while continuously moving such can bodies along a longitudinally-extended travel path through a can body fabricating line comprising, in combination a lubricant source means providing lubricant in liquid form, a lubricant deposition chamber, means defining a horizontally-oriented travel path for can bodies through such deposition chamber, atomizing chamber means including atomizing means for converting such liquid lubricant into particles capable of being pneumatically transported by gas under pressure supplied to such atomizing chamber, such lubricant deposition chamber being defined by enclosure means including lateral side wall means on opposite lateral sides of such longitudinally-extended horizontally-oriented travel path, floor means below such travel path, top wall means above such travel path, and longitudinal end walls defining respective entrance and exit openings for can bodies entering into and exiting from such deposition chamber, such atomizing chamber means being located vertically below such deposition chamber and separated therefrom by such floor means;

means for supplying cup-shaped can bodies having a closed end wall and a side wall extending longitudinally therefrom symmetrically with a can body central longitudinal axis to define an open end longitudinally opposite such can body closed end wall, such can bodies including flange metal extending radially outwardly from such open end in a plane substantially perpendicularly transverse to such central longitudinal axis, conveyance means for controlling continuous-line passage of such can bodies in spaced relationship to each other through such lubricant deposition chamber, such conveyance means defining such horizontally-oriented travel path through such deposition chamber along which such can bodies are oriented open end down with their central longitudinal axes substantially vertical in parallel relationship, and means for pneumatically directing movement of gas-borne atomized lubricant particles into the lubricant deposition chamber including apertures defined in the floor means of such deposition chamber below such horizontal travel path for directing atomized lubricant particles directly into open ends of such can bodies from apertures vertically below such open ends and extending along such travel path for deposition by flow impingement on internal surfaces of such can bodies during such continuous-line passage.

2. The apparatus of claim 1 in which such lubricant source means includes a plurality of lubricant reservoir means located in such atomizing chamber means, such atomizing chamber means is located vertically below such deposition chamber, and is subdivided vertically into a pair of atomizing chambers, each with an associated atomizing means for supplying such lubricant particles within its atomizing chamber and, in which such means for pneumatically directing gas-borne particles into such deposition chamber includes pressurized gas supply means for each such atomizing chamber, and each such atomizing chamber communicates with such deposition chamber.

3. The apparatus of claim 2 in which such means for directing gas-borne particles into such lubricant deposition chamber further includes apertures in lateral side wall means for directing lubricant particles into such deposition chamber.

4. The apparatus of claim 1 including additional apertures at a level above such bottom wall means for introducing gas-borne lubricant particles into such deposition chamber from each lateral side of such travel path for deposition of at least a portion of such particles on external surfaces of such can bodies due to flow impingement with such external surfaces.

5. The structure of claim 1 in which such means for pneumatically directing movement of such gas-borne lubricant particles further includes gas flow passage means between such lubricant atomizing means and such lubricant deposition chamber leading to additional apertures defined in lateral side walls of such lubricant deposition chamber for introducing gas-borne lubricant particles from a plurality of locations positioned laterally of such travel path for can bodies and at a level above such bottom wall means, such deposition chamber enclosure means being non-electrically conductive, and further including electrical charging means located in space relationship from the closed end of such can bodies for electrically charging at least a portion of such pneumatically-directed gas-borne lubricant particles in such chamber for deposition on such can bodies, and means for electrically grounding external surfaces of such can bodies by individually contacting the external surface of each such can body a plurality of times during such passage along such travel path.

6. The apparatus of claim 1 in which further including in relation to such longitudinal end wall means defined entry and exit openings for can bodies at longitudinally opposite ends of such travel path, exhaust collection means located contiguous to each such opening for gathering gas-borne flow-through lubricant particles escaping from such openings.

7. The apparatus of claim 6 in which such enclosure means is formed from rigid, plastic non-electrically conductive sheet material, further including electrical means for electrostatically charging lubricant particles in such deposition chamber, and in which such can bodies are electrically grounded by a plurality of flexible electrical conductors positioned in spaced relationship along such horizontal travel path for such can bodies.

8. The apparatus of claim 1 in which such conveyance means comprises elongated tubular-configuration endless belt loop means providing for such continuous-line passage through such lubricant deposition chamber, and support means adjustably located at opposite longitudinal ends of such travel path through such lubricant chamber for controllably positioning such endless belts for travel through such lubricant deposition chamber, and belt cleaning means located externally of such deposition chamber in a return path of such loop means for cleaning such endless belts.

* * * * *